(12) United States Patent
Seshadri et al.

(10) Patent No.: US 10,896,252 B2
(45) Date of Patent: Jan. 19, 2021

(54) COMPOSITE CHALLENGE TASK GENERATION AND DEPLOYMENT

(71) Applicant: International Business Machines Corporation, Armonk, NY (US)

(72) Inventors: Padmanabha Venkatagiri Seshadri, Mysore (IN); Vijay Ekambaram, Chennai (IN); Arvind Kumar, Karawal Nagar (IN); Bidhu Ranjan Sahoo, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 294 days.

(21) Appl. No.: 16/027,053

(22) Filed: Jul. 3, 2018

(65) Prior Publication Data
US 2020/0012780 A1 Jan. 9, 2020

(51) Int. Cl.
*G06F 21/45* (2013.01)

(52) U.S. Cl.
CPC ...... *G06F 21/45* (2013.01); *G06F 2221/2103* (2013.01); *G06F 2221/2133* (2013.01)

(58) Field of Classification Search
CPC .......... G06F 21/45; G06F 2221/2133; G06F 2221/2103; H04L 2463/082; H04L 9/3271; H04L 63/08; H04W 12/00502
USPC .......................................................... 726/6
See application file for complete search history.

(56) References Cited

U.S. PATENT DOCUMENTS

| | | |
|---|---|---|
| 7,929,805 B2 | 4/2011 | Wang et al. |
| 8,214,891 B2 | 7/2012 | Seacat |
| 8,380,503 B2 | 2/2013 | Gross |
| 8,397,275 B1 | 3/2013 | Magdsick |
| 8,494,854 B2 | 7/2013 | Gross |

(Continued)

OTHER PUBLICATIONS

Scratch Wiki, Scratch Source Code, Jun. 27, 2018, 5 pages, available at: https://wiki.scratch.mit.edu/wiki/Scratch_Source_Code.

(Continued)

*Primary Examiner* — Kambiz Zand
*Assistant Examiner* — Aubrey H Wyszynski
(74) *Attorney, Agent, or Firm* — Ference & Associates LLC

(57) ABSTRACT

One embodiment provides a method, including: receiving at least two challenge test mechanisms of different challenge test modalities, wherein a challenge test mechanism comprises a challenge portion of a challenge-response test for distinguishing between a human operator and a computer; receiving challenge test operators for combining the at least two challenge test mechanisms; generating a composite challenge task by combining the at least two challenge test mechanisms using the identified challenge test operators; identifying any errors in the composite challenge task by running the composite challenge task; evaluating the composite challenge task to determine (i) a challenge difficulty for a human operator and (ii) a challenge difficulty for a computer; and implementing the composite challenge task if (i) no errors are identified at the composite challenge task analyzer, (ii) the challenge difficulty for a human operator is below a predetermined threshold, and (iii) the challenge difficulty for a computer is above a predetermined threshold.

20 Claims, 3 Drawing Sheets

(56) References Cited

U.S. PATENT DOCUMENTS

| | | | |
|---|---|---|---|
| 8,601,538 B2 | 12/2013 | Qvarfordt et al. | |
| 8,793,135 B2 | 7/2014 | Lewis et al. | |
| 8,868,423 B2 | 10/2014 | Gross | |
| 9,192,861 B2 | 11/2015 | Gross | |
| 9,266,023 B2 | 2/2016 | Gross | |
| 9,295,917 B2 | 3/2016 | Gross | |
| 9,558,337 B2* | 1/2017 | Gross | G10L 17/22 |
| 2009/0012855 A1 | 1/2009 | Jamal et al. | |
| 2009/0113294 A1* | 4/2009 | Sanghavi | G06F 40/103 |
| | | | 715/269 |
| 2010/0077210 A1 | 3/2010 | Broder et al. | |
| 2010/0212018 A1* | 8/2010 | Rangarajan | G06F 21/32 |
| | | | 726/26 |
| 2011/0029781 A1* | 2/2011 | Clark | G06F 21/31 |
| | | | 713/182 |
| 2012/0054834 A1* | 3/2012 | King | G06F 21/31 |
| | | | 726/4 |
| 2013/0124425 A1* | 5/2013 | Agrawal | G06Q 20/42 |
| | | | 705/75 |
| 2014/0304797 A1* | 10/2014 | Fu | G06F 21/335 |
| | | | 726/10 |
| 2017/0026367 A1 | 1/2017 | Shuster | |
| 2017/0161490 A1 | 6/2017 | Fedor | |
| 2017/0316200 A1 | 11/2017 | Jakobsson et al. | |

OTHER PUBLICATIONS

Margarita Osadchy et al., "No Bot Expects the DeepCAPTCHAI Introducing Immutable Adversarial Examples with Applications to CAPTCHA", Feb. 2016, 16 pages, USENIX.

Marco A.F. Pimentel et al., "A review of novelty detection", Signal Processing 99, 2014, pp. 215-249, Elsevier B.V.

Yang-Wai Chow et al., "AniCAP: An animated 3D CAPTCHA scheme based on motion parallax", International Conference on Cryptology and Network Security, 2011, 14 pages, Springer Berlin Heidelberg.

Darryl D'Souza et al., "Avatar CAPTCHA: Telling Computers and Humans Apart via Face Classification", IEEE International Conference on Electro/Information Technology (EIT), 2012, 6 pages, IEEE Digital Library.

Nan Jiang et al., "A Gesture-based CAPTCHA Design Supporting Mobile Devices", Proceedings of the 2015 British HCI Conference, Jul. 13-17, 2015, Lincoln, United Kingdom, 7 pages, ACM Digital Library.

Thomas Hupperich et al., "Sensor Captchas: On the Usability of Instrumenting Hardware Sensors to Prove Liveliness", International Conference on Trust and Trustworthy Computing, 2016, 21 pages, Springer International Publishing.

Steven A. Ross et al., "Sketcha: A Captcha Based on Line Drawings of 3D Models", Proceedings of the 19th International Conference on World Wide Web (WWW 2010), Apr. 26-30, 2010, Raleigh, North Carolina, USA, 10 pages, ACM Digital Library.

* cited by examiner

COMPOSITE CHALLENGE TASK GENERATION AND DEPLOYMENT

BACKGROUND

Users frequently utilize information handling devices ("devices"), for example laptop and personal computers, tablet devices, smart phones, smart speakers, and the like, to access various types of information and/or to complete various user-commanded tasks. For example, users may use devices to browse websites, conduct transactions, create and/or make changes to existing files, and the like. However, these network accessible locations (e.g., Internet websites, data storage locations, etc.) are susceptible to attacks by adversaries who may want to automatically extract information or data from the network location. Another type of adversary may want to overwhelm the network accessible location with requests or queries in order to disable or reduce the responsiveness of the network accessible location. These adversaries generally employ a computer executing a series of instructions to perform the desired attack.

Thus, many of these network accessible locations may employ a challenge-response test to distinguish between a human operator and a computer or robot. The challenge-response test presents a challenge to the human operator or computer before access to the desired network accessible location. Upon receiving a correct response to the challenge by the accessing entity, the system allows access to the network accessible location. These challenge-response tests are generally easy for a human operator to perform or respond to, but are difficult for a computer to perform or respond to. Therefore, the implementation of such a human-user verification system may distinguish human input from machine input and may aid in thwarting spam and automated extraction of data (e.g., from websites, from files, etc.).

BRIEF SUMMARY

In summary, one aspect of the invention provides a method comprising: receiving at least two challenge test mechanisms of different challenge test modalities, wherein a challenge test mechanism comprises a challenge portion of a challenge-response test for distinguishing between a human operator and a computer; receiving challenge test operators for combining the at least two challenge test mechanisms; generating a composite challenge task by combining the at least two challenge test mechanisms using the identified challenge test operators; identifying, using a composite challenge task analyzer, any errors in the composite challenge task by running the composite challenge task; evaluating, using the composite challenge task analyzer, the composite challenge task to determine (i) a challenge difficulty for a human operator and (ii) a challenge difficulty for a computer; and implementing the composite challenge task if (i) no errors are identified at the composite challenge task analyzer, (ii) the challenge difficulty for a human operator is below a predetermined threshold, and (iii) the challenge difficulty for a computer is above a predetermined threshold.

Another aspect of the invention provides an apparatus, comprising: at least one processor; and a computer readable storage medium having computer readable program code embodied therewith and executable by the at least one processor, the computer readable program code comprising: computer readable program code configured to receive at least two challenge test mechanisms of different challenge test modalities, wherein a challenge test mechanism comprises a challenge portion of a challenge-response test for distinguishing between a human operator and a computer; computer readable program code configured to receive challenge test operators for combining the at least two challenge test mechanisms; computer readable program code configured to generate a composite challenge task by combining the at least two challenge test mechanisms using the identified challenge test operators; computer readable program code configured to identify, using a composite challenge task analyzer, any errors in the composite challenge task by running the composite challenge task; computer readable program code configured to evaluate, using the composite challenge task analyzer, the composite challenge task to determine (i) a challenge difficulty for a human operator and (ii) a challenge difficulty for a computer; and computer readable program code configured to implement the composite challenge task if (i) no errors are identified at the composite challenge task analyzer, (ii) the challenge difficulty for a human operator is below a predetermined threshold, and (iii) the challenge difficulty for a computer is above a predetermined threshold.

An additional aspect of the invention provides a computer program product, comprising: a computer readable storage medium having computer readable program code embodied therewith, the computer readable program code executable by a processor and comprising: computer readable program code configured to receive at least two challenge test mechanisms of different challenge test modalities, wherein a challenge test mechanism comprises a challenge portion of a challenge-response test for distinguishing between a human operator and a computer; computer readable program code configured to receive challenge test operators for combining the at least two challenge test mechanisms; computer readable program code configured to generate a composite challenge task by combining the at least two challenge test mechanisms using the identified challenge test operators; computer readable program code configured to identify, using a composite challenge task analyzer, any errors in the composite challenge task by running the composite challenge task; computer readable program code configured to evaluate, using the composite challenge task analyzer, the composite challenge task to determine (i) a challenge difficulty for a human operator and (ii) a challenge difficulty for a computer; and computer readable program code configured to implement the composite challenge task if (i) no errors are identified at the composite challenge task analyzer, (ii) the challenge difficulty for a human operator is below a predetermined threshold, and (iii) the challenge difficulty for a computer is above a predetermined threshold.

A further aspect of the invention provides a method, comprising: creating a combined challenge test for distinguishing between a human user and a computer using (i) at least two challenge test mechanisms of different modalities and (ii) at least one operator identifying how the at least two challenge test mechanisms are to be combined within the combined challenge test; providing, responsive to running the combined challenge test in a runtime environment, a runtime script identifying errors in execution of the combined challenge test; testing the combined challenge test, wherein the testing comprises evaluating the combined challenge test to determine (i) a difficulty level for a human operator to respond to the combined challenge test and (ii) an effectiveness of the combined challenge test against a computer adversary; and employing the combined challenge test based upon (i) the difficulty level for a human operator being below a predetermined threshold and (ii) the effectiveness of the combined challenge test being above a predetermined threshold.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
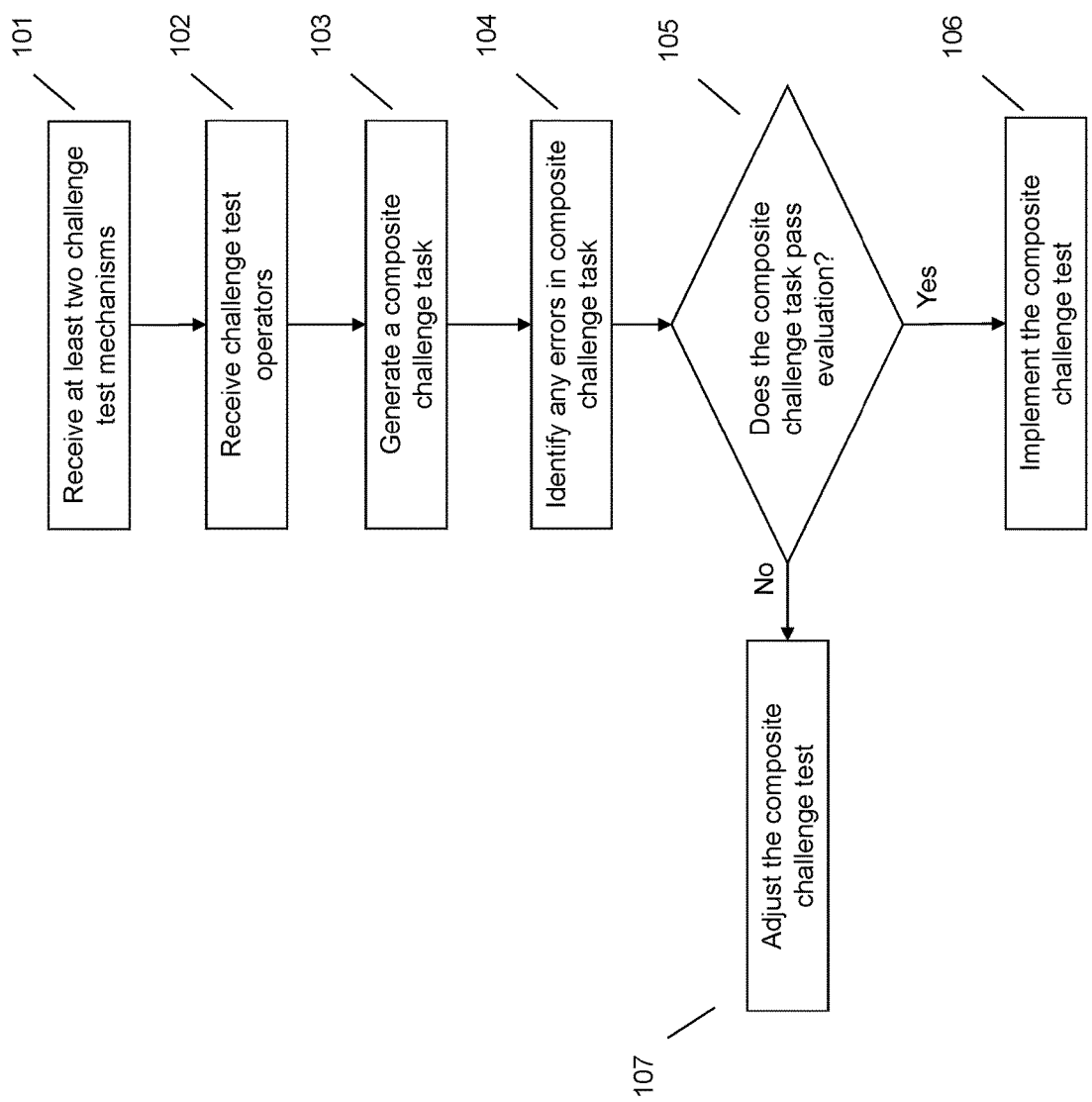
FIG. 1 illustrates a method of generation, evaluation, and deployment of a composite challenge task.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

An example of a widely used challenge-response verification program or test is the CAPTCHA ("Completely Automated Public Turing test to tell Computers and Humans Apart") system. In this system the entity (e.g., human operator, computer, etc.) attempting to access a network accessible location is presented with a challenge task before access to the location is granted. For example, if a human operator is attempting to access a financial institution website, the human operator may be presented with distorted text and the challenge is to correctly type the distorted text into a response box. As another example, an entity attempting to access a network data storage location may be presented with an image broken into different boxes and the challenge is to select the boxes of the image that correspond to a particular feature (e.g., the boxes including signs, the boxes including cars, etc.). Upon receiving a correct response to the challenge task the system will allow access to the desired network accessible location.

The challenge tasks are designed to be easy for a human, but difficult for a computer. For example, in the case of the distorted text, the computer may have to perform different image correction techniques on the image and then perform optical character recognition in order to identify the word, letters, or other characters included in the text. Thus, such a task requires significant processing resources and time for the computer, whereas a human can easily identify the characters included in the distorted text. As another example, in the case of the boxed image, the computer has to use image parsing techniques, natural language recognition techniques, and other techniques in order to identify the required task, parse the image to identify features that correspond to the task, and then select the correct boxes. Again, this requires significant processing resources and time for the computer, whereas a human can easily identify the features corresponding to the task and select the corresponding boxes.

However, as adversaries become more sophisticated, meaning the ability of the computer to perform processing tasks takes less time and less processing resources, the challenge tasks need to become more difficult for the computer while still being easy for a human operator. One technique for increasing the challenge task difficulty for a computer is the generation of a composite challenge task (CCT). In a CCT more than one challenge task mechanism is combined into a single challenge task, for example, text is embedded within an image. Typically, more than one challenge task modality (e.g., text, image, gesture, audio, video, interaction, etc.) is used within a composite challenge task. Thus, while a human operator can quickly traverse the multiple challenge task mechanisms including multiple challenge task modalities, the computer must take more time and processing resources to perform the challenge tasks.

However, the conventional CCTs do not provide a challenge task that can choose different modalities based upon the context of the CCT. In other words, the developer of the CCT has to select the modalities that will be combined within the CCT for each instance of the CCT. After the modalities are selected, the CCT will always use the same modalities during implementation of the CCT. Thus, the implementation of the CCT does not allow for changing of the modalities during implementation. Additionally, the conventional CCTs cannot auto-adapt based upon adversaries who are attempting to respond to the CCT. In other words, once the CCT is deployed or implemented the CCT performs as programmed and cannot react to adversaries or profiles of a user attempting to respond to the challenge task. Thus, if the adversary determines how to accurately or effectively respond to the CCT, the CCT is no longer effective against the adversary with no recourse for correcting the CCT other than programming a new CCT.

Additionally, conventional CCTs do not provide a challenge task that can be customized by a developer based upon a challenge difficulty for a human operator and a challenge difficulty for a computer. In other words, the conventional CCTs do not provide a technique for evaluating the CCT before implementation of the CCT. Thus, the CCT may suffer from deficiencies (e.g., difficulty in the human interaction, low effectiveness against adversaries, difficult for a human to traverse, etc.) which will be unknown until the CCT is implemented. Additionally, once the CCT is implemented, the developer has to monitor the CCT and interactions with the CCT to determine whether any issues arise.

Accordingly, the techniques and systems as described herein provide a system and technique for the generation and implementation of a composite challenge task that is evaluated for human operator and computer difficulty levels and can auto-adapt while implemented. The system receives or identifies at least two challenge test mechanisms having different challenge test modalities. The challenge test mechanisms include the challenge portion of a challenge-response test for distinguishing between a human operator and a computer. The challenge test modalities may include the types or modalities of the challenge test mechanism. For example, the challenge test modalities may include a text-based challenge test mechanism, an image-based challenge test mechanism, a gesture-based challenge test mechanism, an audio output-based challenge test mechanism, and the like. In other words, the challenge test modality may identify how the challenge portion is presented to the user, and, thus, how the user will respond to the challenge test.

The system may also receive or identify one or more challenge test operators for combining the at least two challenge test mechanisms. The challenge test operators may identify how the challenge test mechanisms should be combined. For example, a challenge test operator may indicate that one challenge test mechanism should be embedded within another challenge test mechanism. As another example, a challenge test operator may indicate that one challenge test mechanism should be presented after another challenge test mechanism. The system may generate a composite challenge task from the at least two challenge test mechanisms and the challenge test operators by combining the test mechanisms using the test operators.

The system may analyze the composite challenge task to identify any errors, for example, run-time errors. Additionally, the system may analyze the composite challenge task to evaluate the composite challenge task to determine a challenge difficulty for a human operator and a challenge difficulty for a computer. In other words, the system may attempt to determine if the composite challenge task will be "easy" for a human operator to perform or respond to and difficult for a computer to perform or respond to. If the composite challenge task has no errors, has a human operator difficulty level below a predetermined threshold, and a computer difficulty level above a predetermined threshold, the system may implement or deploy the composite challenge task. During implementation or deployment the system may monitor interaction logs to determine if the composite challenge task is effective against adversaries, if human operators are having difficulty or spending a long time on the task, or the like. If the system identifies any deficiencies or issues with the task, the system can adapt the composite challenge task while deployed. Additionally, the system can adapt the composite challenge task if the system detects that adversaries are attempting to perform or respond to the composite challenge task.

Such a system provides a technical improvement over current systems for creation and implementation of challenge-response verification programs. The systems and methods as described herein provide a visual programming technique and system for the creation and implementation of composite challenge tasks using different challenge test mechanisms including mechanisms of different modalities. Additionally, the system provides for the creation of a composite challenge task that can adapt the modalities of the composite challenge task or the difficulty of the composite challenge task during runtime, deployment, or implementation of the CCT. Thus, as opposed to conventional techniques where the CCT is static and cannot dynamically adapt to possible adversaries or users, the described system provides a technique for programming the CCT that allows the CCT to adapt while it is deployed.

Additionally, the systems and methods as described herein provide a technique that allows for evaluation of the CCT before deployment or implementation. Using adversarial models and logs from previously or currently implemented CCTs, the system can evaluate the proposed CCT to identify a human operator challenge difficulty level, a computer challenge difficulty level, any potential interaction errors, and the like. Thus, unlike conventional systems where the CCT can only be evaluated after implementation and if a developer monitors the CCT, the system described herein allows for evaluation of the CCT before the CCT is even implemented and provides a technique for providing feedback to the developer that indicates any weak portions of the CCT that should be addressed. Accordingly, the described system and method provides a technical improvement to the technological field of challenge-response verification programs by providing a technique for creation of more robust challenge-response tasks than can be created using conventional techniques.

FIG. 1 illustrates a method for generating and implementing a composite challenge task that is evaluated for human operator and computer difficulty levels and can auto-adapt while implemented. The system as described herein may provide a visual programming system that allows a user or other developer to generate, verify, evaluate, and implement or deploy a challenge-response task. At 101 the system may receive at least two challenge test mechanisms of different challenge test modalities. A challenge test mechanism is the challenge portion of a challenge-response test for distinguishing between a human operator and a computer. The system may receive more than two challenge test mechanisms, for example, the computer may receive an indication of three, five, ten, or the like number, of challenge test mechanisms.

Receipt of the challenge test mechanism may include receiving input from a developer or other user indicating which mechanisms should or could be included in the challenge-response test. For example, the developer may select the different challenge test mechanisms that will be combined into the composite challenge tasks, as described in more detail below. As another example, a developer may select the different mechanisms that can be used by the challenge-response system when the system is deployed. In other words, the deployed system does not have to use all the identified challenge test mechanisms for every challenge-response task that is presented. Rather, the system may choose from any of the indicated challenge test mechanisms. Thus, receipt of the challenge test mechanisms may include the system selecting the challenge test mechanisms to be used for the challenge-response task.

At least a portion of these challenge test mechanisms may be of different challenge test modalities. A challenge test modality refers to the type of input or output that is associated with the challenge test mechanism, meaning the mechanism may be presented in a particular modality or may require a response in a particular modality. For example, one challenge test modality may be a text-based modality where the challenge test is presented as a text based challenge. The expected or correct response to a text-based modality may be a user entering the text into a free-form input box, selecting the text from an image, or the like. Another example of a challenge test modality is a gesture-based modality where the challenge test is presented as a gesture or the challenge test requires the user who is presented with the challenge test to perform a particular gesture. Other types of challenge test modalities are illustrated in FIG. 2 at 201 and may include an image modality, video modality, output speech modality, interaction modality, input speech modality, gesture modality, sensor modality, or a custom modality.

At 102 the system may receive challenge test operators for combining the challenge test mechanisms. Like the challenge test mechanisms, the challenge test operators may include a selection by a developer during programming or by the system itself during deployment of the challenge test operators to be used for combining the challenge test mechanisms. Additionally, like the challenge test mechanisms, a selection by a developer during programming may include a selection of all the challenge test operators that could be selected by the system, or a selection of the challenge test operators that will be used for a specific challenge test task. Example challenge test operators are identified at 202 in FIG. 2 and include an add operator, a remove operator, an equal-to operator, a pipe operator, a not-equal-to operator, a transform operator, an assign operator, a loop operator including a condition, an if-else operator including a condition, a custom operator, or the like. An example operator may include an add operator where one test mechanism is added to another test mechanism. Another example operator may result in the system providing one test mechanism after another one has been presented. Other operators may result in a selection between different test mechanisms, showing a test mechanism after a predetermined time period has elapsed, transforming one test mechanism to a different test mechanism, and the like.

With the operators, the system may receive additional metadata or meta-parameters that identify more details about how the test mechanisms should be combined. For example, the meta-parameters may identify a location within a test mechanism that another test mechanism should be located. As an example, meta-parameters may identify where in an interactive video mechanism a text mechanism should be located. Additional metadata or meta-parameters may be included, for example, whether a test mechanism should be manipulated before or during combination with another test mechanism, the size of a test mechanism, the length of time for a test mechanism to be displayed, a number of times that the test mechanism should be repeated, the content of the test mechanism, and the like.

At 103 the system may generate a composite challenge task (CCT) by combining the identified challenge test mechanisms using the identified operators. Generation of the composite challenge task may include converting one test mechanism to a different format so that it can be combined with another test mechanism. For example, if the system has received selection of a text test mechanism and an image test mechanism and an add operator, the system may identify that the text mechanism is to be embedded into the image mechanism. In this example, the system may convert the text to an image and overlay or otherwise embed the text image onto or within the image. Additionally, the system may perform other actions on each test mechanism before combination or during combination into a CCT. For example, in the example of a text-based test mechanism, the system may first distort the text in order to make it more difficult for a computer or machine to recognize.

Figure 2:
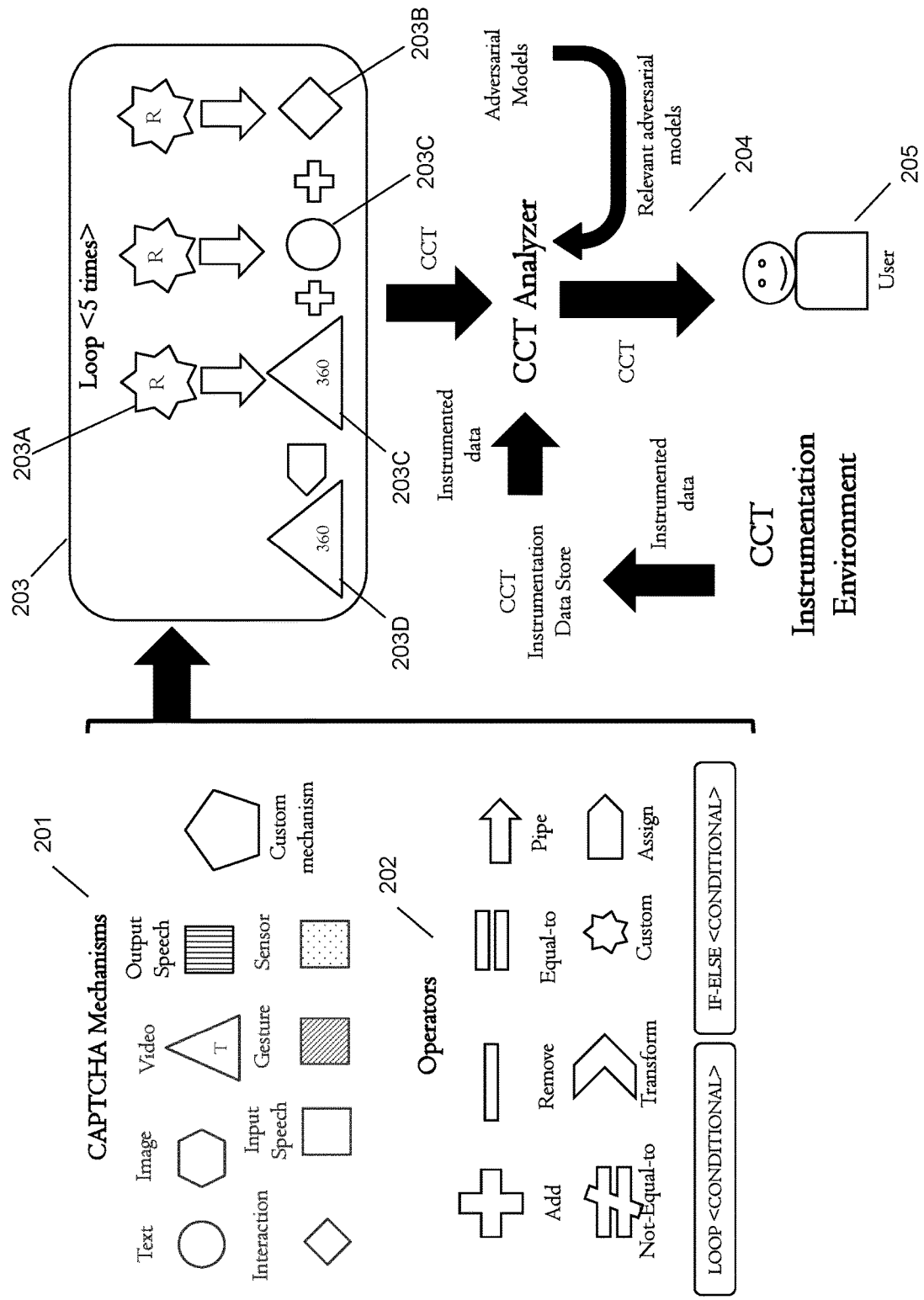
FIG. 2 illustrates an example composite challenge task generation system.

An example of generation of a CCT is illustrated in FIG. 2 at 203. In this example, the system receives the content of the test mechanism as illustrated at 203A. The content of the test mechanism indicates what is included in the test mechanism. For example, in a text-based test mechanism, the content would indicate the word or characters that are included in the text-based test mechanism. As another example, in an image-based test mechanism, the content would indicate the image or image feature that is to be included in the image-based test mechanism. In the example at 203, the test mechanisms that were received are an interaction mechanism 203B, a text mechanism 203C, and a 360° video mechanism. Thus, the content 203A of each of these mechanisms would indicate the interaction that is to occur, the text to be included, and the 360° video to be used, respectively. As stated above, the mechanisms and/or the content that are selected may be randomly selected by system during deployment of the CCT. The operators that are indicated are a loop with condition operator, add operators, pipe operators, and assign operators. These operators may also be randomly selected by the system during deployment of the CCT. In this example, the resulting CCT would be a 360° interactive video that has embedded text and that challenges the entity five times.

The generation of the composite challenge task may occur during implementation. For example, if the developer has programmed the system to select different test mechanisms and/or operators, the system may make the selection during deployment and then generate the CCT as an entity attempts to access the desired network accessible location. The generation of the composite challenge task may be responsive to receiving interaction logs during deployment of the CCT. The generation of a CCT that is responsive to the interaction logs allows the system to auto-adapt the CCT based upon difficulties that a human operator has with the CCT, detection of an adversary, and the like. The interaction logs and information that can be obtained from the interaction logs will be discussed in more detail below.

At 104 the system may analyze, using a composite challenge task analyzer, for example, as shown at 204 of FIG. 2, the generated CCT to identify any errors in the CCT. This analysis may occur by running or executing the CCT, for example, in a programming sandbox, using a programming executor, or the like, and identifying whether any errors occur during this execution. The system may also perform a syntactic analysis to identify any errors. The syntactic analysis identifies the syntactic correctness and ensures whether the input/output contracts of the individual visual blocks (e.g., test mechanisms, test operators, etc.) are honored by the CCT. In other words, the system identifies whether the system uses the test mechanisms and test operators as programmed and whether the output of these implementations results in the expected output. To perform the syntactic analysis the system may parse the program and perform symbol analysis to determine the consistency of the input/output types.

At 105 the system may use the CCT analyzer to analyze the CCT to determine whether it passes an evaluation stage. The evaluation stage may include determining a challenge difficulty for a human operator and a challenge difficulty for a computer. To determine a challenge difficulty for a human operator the system may estimate a user time that will be or is predicted to be spent on responding to the CCT. The amount of time spent on each element of the CCT may indicate the level of difficulty that a user will have in responding to the CCT. Estimating the user time may be performed by executing the CCT with an interaction logger. The interaction logger will capture and log all user interactions that occur with the CCT, for example, during deployment of the CCT. These logs are then reported to the data store for future access. For example, the system may deploy a CCT and then identify how long a user spends performing the CCT. Upon development of a similar CCT, the system may access the interaction log associated with the previously deployed CCT to estimate how long the user will spend on the current CCT. The system may also identify the total time it takes a user to perform or respond to the CCT. The overall time would include any time it took for the entity or user to understand the task, which would not be included in any interaction information. The overall time may be based upon the amount of time that elapses between presentation of the CCT and completion of the CCT, thus, including any time spent by the user before the user interacts with the CCT.

Estimation of the user time may also be performed based upon elements included in the CCT. In other words, estimating the user interaction time may be performed by summing the estimated interaction time for each element included in the CCT. For example, a CCT may be deployed having particular elements. During deployment the interaction logger may log the user interaction with each element. This log may also include a user dwell time associated with each element. During development of subsequent CCTs, the system can access the interaction logs to identify how long users spend on a particular element that is intended or identified as being incorporated into the CCT. Based upon these historical logs with respect to each feature, the system can estimate how long a user would spend on the current CCT based upon the elements included in the current CCT. As an example, the system may create a control-flow graph for a given CCT. For each possible flow, the total dwell time may be estimated based upon the elements included in the CCT. The maximum time of all the flows would provide a worst-case estimate, the average time for all the flows would provide an average-case estimate, and the like.

Determining the challenge difficulty for a human operator may also include estimating interaction difficulties. Interaction difficulties may include interactions, test mechanisms, or CCTs that cause the user to perform more interactions that normal to perform the task. Estimating interaction difficulties may also be based upon analysis of the interaction logs. The number of normal interactions to perform a particular task may be identified using the information included in the interaction log. For example, the system may identify an element or overall task and determine the average number of interactions that users perform in order to respond to that element or an overall task. Estimating the interaction difficulty may include using a supervised or unsupervised technique. In a supervised method crowd-sourcing methods could be used to collect training interaction data. The interaction logs or training data logs may be input to a novelty detection method that uses the logs to classify an interaction received at a deployed CCT as normal or novel. If the interaction for the deployed CCT is classified as novel and the task is performed sooner than expected, the system may identify that the entity performing the task is a machine or computer. If the task is novel and performed later than expected, the system may identify that the task is difficult for a human operator.

The system may also determine a challenge difficulty for a computer or machine with respect to the CCT. In other words, the system may determine or estimate an effectiveness of the CCT against adversarial attacks. To determine the challenge difficulty the system may access information related to previously deployed CCTs that have a similarity to the current CCT. The system may then determine how effective the previously deployed CCTs were against adversarial attacks and associate that effectiveness with the current CCT. To determine the challenge difficulty for a computer, the system may employ an adversarial model to attack or simulate an attack against the CCT. The system may construct the chain or flow of the adversarial models, for example, using known adversarial models, using interaction logs from previously deployed CCTs, and/or the like, to mirror the control flow of the CCT. The system may then execute the adversarial model chain in the CCT output to determine the robustness of the CCT against attacks by the adversary represented by the adversarial model. Executing the adversarial model against the CCT also allows the system to determine if any portion of the CCT is weak against an adversarial attack. For example, upon execution of the adversarial model against the CCT, the system may identify that the text test mechanism is easily overcome or responded to by the adversary. Upon identification of any weak points or portions of the CCT, the system may notify the developer of these weak points and may offer recommendations for improving the CCT to make it more effective against adversarial attacks.

Thus, the interaction or client side logs may be used to determine the challenge difficulty for a human operator, the challenge difficulty for a computer, a length of time that a human operator spends responding to the composite challenge task, or the like. In other words, the interaction logs may be used to determine whether the CCT will be easy for a human operator and effective against adversaries. The evaluation of the CCT may occur before deployment or implementation of the CCT or may occur during deployment or implementation of the CCT. Therefore, the interaction logs may additionally be used during deployment or implementation of the CCT by the system to adapt the CCT. For example, if, based upon the interaction logs, the system detects that an adversary is attempting to respond to the CCT, the system may select test mechanisms and operators that are very difficult for a computer or machine to perform, thereby preventing the adversary from accessing the network accessible location. In other words, the system may detect an adversarial attack during deployment and adapt the CCT to prevent the attack. As another example, if the system analyzes the logs and detects no presence of log inferences performing optical character recognition (OCR), then the system may remove the text test mechanism from the output, thereby making the CCT easier for a human operator since no machines were attempting to perform the CCT. As another example, if the system analyzes the logs and detects that sensors for capturing gestures are not currently working, the system may adapt the CCT to not include gesture test mechanisms.

The system may determine if the challenge difficulty for a human operator is below a predetermined threshold and if the challenge difficulty for a computer or machine is above a predetermined threshold. The predetermined threshold may be a number, rating, range, or the like, as set by the developer. For example, the system may score the challenge difficulty of the CCT and compare that score with the predetermined threshold. However, the predetermined threshold may not be a particular number, rating, or range. Rather, the predetermined threshold may simply be the developer indicating that the difficulty for either the human operator or computer is acceptable to the developer.

If the composite challenge task does not pass the evaluation, for example, the composite challenge task includes errors, has a challenge difficulty for a human operator above a predetermined threshold, and/or has a challenge difficulty for a computer or machine below a predetermined threshold, at 105, the system may adjust the composite challenge test at 107 to correct or address the identified deficiencies. If, however, the composite challenge task passes evaluation at 105, meaning the CCT has no errors, has a challenge difficulty for a human operator above a predetermined threshold, and a challenge difficulty for a computer or machine below a predetermined threshold, the system may implement or deploy the CCT at 106. Implementing or deploying the CCT may include deploying the programming for the CCT at a network accessible location. Implementing or deploying may also include deploying or implementing a particular CCT as generated by the system after the CCT program has been deployed.

Thus, the described system and method provides an improvement to conventional creation and deployment of challenge-response tests. The system and method provide a programming environment that allows the creation of a composite challenge task either by a developer or by the system after deployment of the CCT programming that can be evaluated for effectiveness against an adversary and difficulty for a human operator, which are not possible using conventional techniques. Additionally, the system can automatically adapt the CCT during deployment in order to respond to adversary attacks, specific limitations of a human operator attempting to respond to the CCT, or the like. Auto-adaption of a CCT is not possible with conventional techniques where the challenge-response test is static and specifically programmed to present a test, even if adversaries have successfully responded to the challenge-response test. Accordingly, the described systems and methods provide a significant technical improvement to the technological field of creation and implementation of challenge-response tests.

Figure 3:
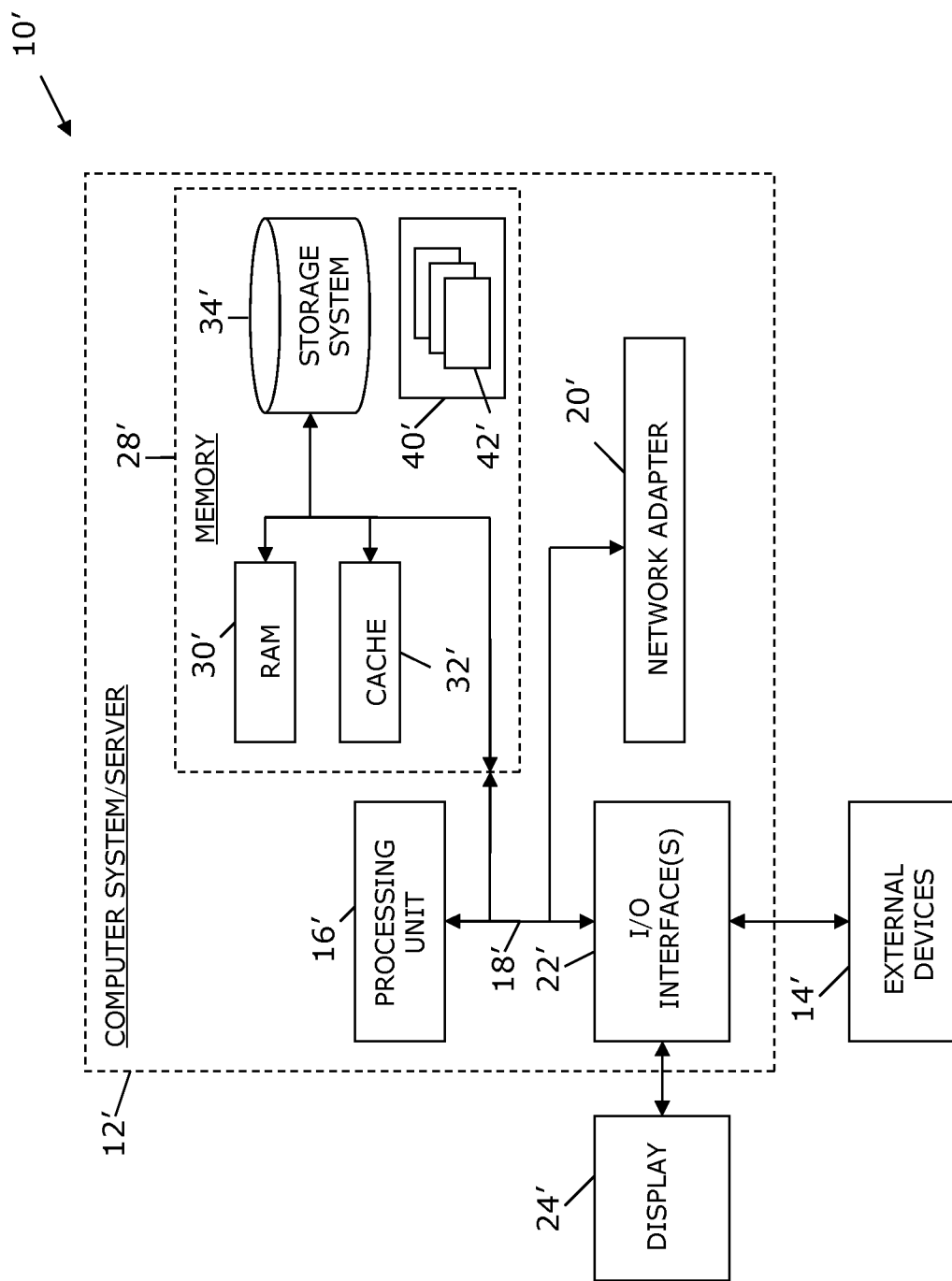
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method performed by a hardware processor, the method comprising:
    receiving at least two challenge test mechanisms of different challenge test modalities, wherein a challenge test mechanism comprises a challenge portion of a challenge-response test for distinguishing between a human operator and a computer;
    receiving challenge test operators for combining the at least two challenge test mechanisms;
    generating a composite challenge task by combining the at least two challenge test mechanisms using the received challenge test operators;
    identifying, using a composite challenge task analyzer, any errors in the composite challenge task by running the composite challenge task;
    evaluating, using the composite challenge task analyzer, the composite challenge task to determine (i) a challenge difficulty for the human operator and (ii) a challenge difficulty for the computer; and
    implementing the composite challenge task if (i) no errors are identified at the composite challenge task analyzer, (ii) the challenge difficulty for the human operator is below a predetermined threshold, and (iii) the challenge difficulty for the computer is above a predetermined threshold, wherein the implementing the composite challenge task comprises allowing access to a particular network location upon receiving a correct response to the composite challenge task from an accessing entity.

2. The method of claim 1, wherein evaluating the composite challenge task to determine a challenge difficulty for a computer comprises employing at least one adversarial model to attack the composite challenge task.

3. The method of claim 1, comprising identifying at least a portion of the composite challenge task that is weak against adversarial attacks.

4. The method of claim 3, comprising providing a recommendation to a developer of the composite challenge task to correct the at least a portion of the composite challenge task identified as weak.

5. The method of claim 1, comprising evaluating the composite challenge task during implementation and adapting the composite challenge task based upon attempted attacks by adversaries on the composite challenge task during implementation.

6. The method of claim 1, wherein the generating a composite challenge task comprises embedding at least one of the at least two challenge test mechanisms into another of the at least two challenge test mechanisms.

7. The method of claim 1, wherein the identifying any errors comprises performing a syntactic analysis on a program corresponding to the composite challenge tasks by parsing the composite challenge task program.

8. The method of claim 1, wherein the evaluating the composite challenge task to determine a challenge difficulty for a human operator comprises estimating a length of time that a human operator would spend responding to the composite challenge task.

9. The method of claim 1, comprising obtaining logs detailing interactions by users with the composite challenge task during implementation of the composite challenge task.

10. The method of claim 9, wherein the evaluating and determining a length of time that a human operator spends responding to the composite challenge task comprises analyzing the obtained logs.

11. An apparatus, comprising:
    at least one hardware processor; and
    a computer readable storage medium having computer readable program code embodied therewith and executable by the at least one processor, the computer readable program code comprising:
    computer readable program code configured to receive at least two challenge test mechanisms of different challenge test modalities, wherein a challenge test mechanism comprises a challenge portion of a challenge-response test for distinguishing between a human operator and a computer;
    computer readable program code configured to receive challenge test operators for combining the at least two challenge test mechanisms;
    computer readable program code configured to generate a composite challenge task by combining the at least two challenge test mechanisms using the received challenge test operators;
    computer readable program code configured to identify, using a composite challenge task analyzer, any errors in the composite challenge task by running the composite challenge task;
    computer readable program code configured to evaluate, using the composite challenge task analyzer, the composite challenge task to determine (i) a challenge difficulty for the human operator and (ii) a challenge difficulty for the computer; and
    computer readable program code configured to implement the composite challenge task if (i) no errors are identified at the composite challenge task analyzer, (ii) the challenge difficulty for the human operator is below a predetermined threshold, and (iii) the challenge difficulty for the computer is above a predetermined threshold, wherein the implementing the composite challenge task comprises allowing access to a particular network location upon receiving a correct response to the composite challenge task from an accessing entity.

12. A computer program product, comprising:
    a non-transitory computer readable storage medium having computer readable program code embodied therewith, the computer readable program code executable by a processor and comprising:
    computer readable program code configured to receive at least two challenge test mechanisms of different challenge test modalities, wherein a challenge test mechanism comprises a challenge portion of a challenge-response test for distinguishing between a human operator and a computer;
    computer readable program code configured to receive challenge test operators for combining the at least two challenge test mechanisms;

computer readable program code configured to generate a composite challenge task by combining the at least two challenge test mechanisms using the received challenge test operators;

computer readable program code configured to identify, using a composite challenge task analyzer, any errors in the composite challenge task by running the composite challenge task;

computer readable program code configured to evaluate, using the composite challenge task analyzer, the composite challenge task to determine (i) a challenge difficulty for the human operator and (ii) a challenge difficulty for the computer; and computer readable program code configured to implement the composite challenge task if (i) no errors are identified at the composite challenge task analyzer, (ii) the challenge difficulty for the human operator is below a predetermined threshold, and (iii) the challenge difficulty for the computer is above a predetermined threshold, wherein the implementing the composite challenge task comprises allowing access to a particular network location upon receiving a correct response to the composite challenge task from an accessing entity.

13. The computer program product of claim 12, wherein evaluating the composite challenge task to determine a challenge difficulty for a computer comprises employing at least one adversarial model to attack the composite challenge task.

14. The computer program product of claim 12, comprising:
identifying at least a portion of the composite challenge task that is weak against adversarial attacks; and
providing a recommendation to a developer of the composite challenge task to correct the at least a portion of the composite challenge task identified as weak.

15. The computer program product of claim 12, comprising evaluating the composite challenge task during implementation and adapting the composite challenge task based upon attempted attacks by adversaries on the composite challenge task during implementation.

16. The computer program product of claim 12, wherein the generating a composite challenge task comprises embedding at least one of the at least two challenge test mechanisms into another of the at least two challenge test mechanisms.

17. The computer program product of claim 12, wherein the identifying any errors comprises performing a syntactic analysis on a program corresponding to the composite challenge tasks by parsing the composite challenge task program.

18. The computer program product of claim 12, wherein the evaluating the composite challenge task to determine a challenge difficulty for a human operator comprises estimating a length of time that a human operator would spend responding to the composite challenge task.

19. The computer program product of claim 12, comprising:
obtaining logs detailing interactions by users with the composite challenge task during implementation of the composite challenge task; and
wherein the evaluating and determining a length of time that a human operator spends responding to the composite challenge task comprises analyzing the obtained logs.

20. A method performed by a hardware processor, the method comprising:
creating a combined challenge test for distinguishing between a human user and a computer using (i) at least two challenge test mechanisms of different modalities and (ii) at least one operator identifying how the at least two challenge test mechanisms are to be combined within the combined challenge test;
providing, responsive to running the combined challenge test in a runtime environment, a runtime script identifying errors in execution of the combined challenge test;
testing the combined challenge test, wherein the testing comprises evaluating the combined challenge test to determine (i) a difficulty level for a human operator to respond to the combined challenge test and (ii) an effectiveness of the combined challenge test against a computer adversary; and
implementing the combined challenge test based upon (i) the difficulty level for a human operator being below a predetermined threshold and (ii) the effectiveness of the combined challenge test being above a predetermined threshold wherein the implementing the combined challenge test comprises allowing access to a particular network location upon receiving a correct response to the combined challenge test from an accessing entity.

* * * * *